United States Patent
Hu et al.

(10) Patent No.: US 11,866,355 B2
(45) Date of Patent: Jan. 9, 2024

(54) SYSTEM FOR CLEANING WASTEWATER

(71) Applicant: Nanjing University, Nanjing (CN)

(72) Inventors: Haidong Hu, Nanjing (CN); Kewei Liao, Nanjing (CN); Sijia Ma, Nanjing (CN); Yuanji Shi, Nanjing (CN); Hongqiang Ren, Nanjing (CN); Xuxiang Zhang, Nanjing (CN); Bing Wu, Nanjing (CN); Jinfeng Wang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 265 days.

(21) Appl. No.: 17/343,711

(22) Filed: Jun. 9, 2021

(65) Prior Publication Data

US 2022/0356094 A1    Nov. 10, 2022

Related U.S. Application Data

(63) Continuation-in-part of application No. PCT/CN2021/092366, filed on May 8, 2021.

(51) Int. Cl.
*C02F 3/12* (2023.01)
*C02F 11/04* (2006.01)
(Continued)

(52) U.S. Cl.
CPC .......... *C02F 3/1226* (2013.01); *C02F 1/325* (2013.01); *C02F 3/121* (2013.01); *C02F 3/1215* (2013.01);
(Continued)

(58) Field of Classification Search
CPC ........ C02F 3/1226; C02F 1/325; C02F 3/121; C02F 3/1215; C02F 11/04; C02F 11/12;
(Continued)

(56) References Cited

U.S. PATENT DOCUMENTS

2012/0018374 A1*  1/2012  Sun .................. C02F 3/301
                                                210/605

FOREIGN PATENT DOCUMENTS

CN      110316903 A  * 10/2019
CN      110697997 A  *  1/2020
(Continued)

OTHER PUBLICATIONS

Machine-generated English translation of CN 110697997, generated on Apr. 25, 2023.*
(Continued)

*Primary Examiner* — Fred Prince
(74) *Attorney, Agent, or Firm* — MATTHIAS SCHOLL P.C.; Matthias Scholl

(57) ABSTRACT

A system for cleaning wastewater, includes: an absorption-biodegradation-denitrification (ABN) reactor, a sequential adsorption reactor, a disinfection reactor, and a sludge anaerobic fermentation reactor. The ABN reactor is an integrated reactor including: a biosorption tank, an intermediate sedimentation tank, a biologically-enhanced degradation tank, a denitrification biofilter, and a secondary sedimentation tank. The pretreated wastewater is introduced into the ABN reactor for removal of chemical oxygen demand, nitrogen and phosphorus; the ABN reactor effluent is introduced into the sequential adsorption reactor for the removal of high-risk pollutants; the sequential adsorption reactor effluent is introduced into the disinfection reactor for the elimination of viruses and other pathogenic microorganisms; the sludge produced by the ABN reactor is introduced into the anaerobic sludge fermentation reactor for alkaline fermentation. The system is effective for removing high-risk pollutants and reducing effluent toxicity, which can be used for the upgrading and reconstruction of the wastewater treatment system.

8 Claims, 1 Drawing Sheet

(51) Int. Cl.
 *C02F 1/32* (2023.01)
 *C02F 11/12* (2019.01)
 *C02F 101/16* (2006.01)
 *C02F 1/00* (2023.01)

(52) U.S. Cl.
 CPC .............. *C02F 11/04* (2013.01); *C02F 11/12* (2013.01); *C02F 1/32* (2013.01); *C02F 2001/007* (2013.01); *C02F 2101/16* (2013.01); *C02F 2201/322* (2013.01); *C02F 2209/02* (2013.01); *C02F 2209/06* (2013.01); *Y02W 10/10* (2015.05)

(58) Field of Classification Search
 CPC .. C02F 1/32; C02F 2001/007; C02F 2101/16; C02F 2201/322; C02F 2209/02; C02F 2209/06; Y02W 10/10
 USPC .... 210/605, 624, 630, 252, 259, 748.1, 615, 210/616, 617, 748.11, 748.13, 903
 See application file for complete search history.

(56) References Cited

FOREIGN PATENT DOCUMENTS

| | | | |
|---|---|---|---|
| CN | 111925077 A | * | 11/2020 |
| CN | 212315967 U | * | 1/2021 |
| EP | 2468686 A1 | * | 6/2012 |

OTHER PUBLICATIONS

Machine-generated English translation of EP 2468686, generated on Apr. 25, 2023.*
Machine-generated English translation of CN 110316903, generated on Apr. 25, 2023.*
Machine-generated English translation of CN 111925077, generated on Apr. 25, 2023.*
Machine-generated English translation of CN 212315697, generated on Apr. 25, 2023.*

* cited by examiner

SYSTEM FOR CLEANING WASTEWATER

CROSS-REFERENCE TO RELATED APPLICATIONS

This application is a continuation-in-part of International Patent Application No. PCT/CN2021/092366 with an international filing date of May 8, 2021, designating the United States, now pending, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of wastewater treatment, and more particularly, to a system for cleaning wastewater.

Wastewater contains plenty of heat and chemical energy greater than the power consumption in wastewater treatment. The valuable content in the wastewater is not used properly, leading to energy waste. Conventional denitrification and dephosphorization processes cannot recover the energy, occupy large areas, have high power consumption and are costly. Adsorption-biodegradation (AB) process is used for pollutant removal and energy recovery from wastewater. The AB process involves an adsorption tank and an aeration tank. The adsorption tank is configured to adsorb organic compounds from the wastewater and the aeration tank is configured to perform the nitrification reaction. However, the AB process cannot achieve a high nitrogen and phosphorus removal efficiency, so that it is difficult to achieve the water quality discharge standard only by the AB process.

Wastewater contains great quantities of high-risk pollutants from chemical production and daily life, such as persistent organic pollutants, pathogenic bacteria, antibiotics, and estrogen. The high-risk pollutants have a high degree of acute toxicity and is toxic to the aquatic organisms, causing health risks and posing a threat to the biological environment. However, the conventional wastewater treatment processes are insufficient to reduce the concentrations of high-risk pollutants and their toxicity in the effluent of the wastewater treatment plant.

Researchers have upgraded the sewage purification process and established a variety of new processes and systems. However, these treatment processes still cause problems such as low denitrification efficiency, low resource recovery efficiency, high power consumption for equipment operation, large equipment footprint, and complex system operation.

SUMMARY

The disclosure provides a system for cleaning wastewater, comprising four treatment units: an absorption-biodegradation-denitrification (ABN) reactor, a sequential adsorption reactor, a disinfection reactor, and a sludge anaerobic fermentation reactor.

The ABN reactor is an integrated reactor comprising five secondary treatment units: a biosorption tank, an intermediate sedimentation tank, a biologically-enhanced degradation tank, a denitrification biofilter, and a secondary sedimentation tank, which are connected sequentially and separated from each other by a partition wall. The biosorption tank is filled with high-load activated sludge. The biosorption tank comprises a first water inlet, a first water outlet, a first stirring device, a first aeration device, and a first sludge return port. The first water inlet is disposed on the first end of the biosorption tank and the first water outlet is disposed on the second end of the biosorption tank. The first stirring device, the first aeration device, and the first sludge return port are disposed in the bottom of the biosorption tank. The first water outlet communicates with the intermediate sedimentation tank. The intermediate sedimentation tank comprises a first slope plate, a first sludge outlet, and a second water outlet. The first slope plate is disposed in the intermediate sedimentation tank. The first sludge outlet of the intermediate sedimentation tank communicates with a first sludge return pipe and a first sludge outlet pipe of the intermediate sedimentation tank. The second water outlet is disposed on the rear end of the intermediate sedimentation tank and communicates with the biologically-enhanced degradation tank. The first sludge return pipe is connected to the first sludge return port. The biologically-enhanced degradation tank is an integrated fixed-film activated sludge system. The biologically-enhanced degradation tank comprises a second aeration device, a second sludge return port, a filler interceptor, and a third water outlet. The second aeration device and the second sludge return port are disposed in the bottom of the biologically-enhanced degradation tank. The filler interceptor is disposed on one end of the biologically-enhanced degradation tank and is connected through the third water outlet to the secondary sedimentation tank. The secondary sedimentation tank comprises a second slope plate, a second sludge outlet pipe, and a fourth water outlet. The second slope plate is disposed in the secondary sedimentation tank. The second sludge outlet pipe is disposed in the bottom of the secondary sedimentation tank and is configured to communicate with a second sludge return pipe and a second sludge outlet pipe. The second sludge return pipe is connected to the second sludge return port. The fourth water outlet is disposed on one end of the secondary sedimentation tank and is connected to the denitrification biofilter. The denitrification biofilter is a downflow denitrification biofilter comprising a carbon source dosing device, an inlet channel, a backwash air inlet, and a backwash water outlet, a denitrification filler, a supporting layer, an air-water distribution device, a backwash water inlet, a water collection channel, and a fifth water outlet. The carbon source dosing device, the inlet channel, the backwash air inlet, and the backwash water outlet are disposed on the top portion of the denitrification biofilter. The denitrification filler is disposed in the denitrification biofilter. The supporting layer, the air-water distribution device, the backwash water inlet, the water collection channel, and the fifth water outlet are disposed in the bottom of the denitrification biofilter.

The sequential adsorption reactor is a cylindrical reactor comprising secondary treatment units, an overflow pipe, a second water inlet, a third sludge outlet, and a sixth water outlet. The second water inlet and the third sludge outlet are disposed in the middle of the bottom of the sequential adsorption reactor. The sixth water outlet is disposed on the outside bottom of the sequential adsorption reactor. The secondary treatment units each comprises a plurality of adsorption devices. The second water inlet is connected to the overflow pipe. The fifth water outlet is connected through a first diversion pipe to the fifth water outlet.

The disinfection reactor comprises a third water inlet, a disinfection device, a diversion wall, and a seventh water outlet. The third water inlet is disposed on the first end of the disinfection reactor. The disinfection device and the diversion wall are disposed in the disinfection reactor. The seventh water outlet is disposed in the bottom of the second end of the disinfection reactor and is connected to a drainage pipe. The third water inlet is connected through the second diversion tube to the sixth water outlet.

The sludge anaerobic fermentation reactor is a cylindrical upflow reactor comprising a gas emission device, a plurality of feed inlets, a second stirring device, a plurality of feed outlets, a sludge circulating pipe, a sludge dewatering device, a liquid collection device. The gas emission device is disposed on the sludge anaerobic fermentation reactor. The plurality of feed inlets is disposed in the lower part of the sludge anaerobic fermentation reactor. The second stirring device is disposed in the sludge anaerobic fermentation reactor. The plurality of feed outlets and the sludge circulating pipe are disposed at different water levels marked in the sludge anaerobic fermentation reactor. The sludge dewatering device and the liquid collection device are disposed outside of the sludge anaerobic fermentation reactor. The plurality of feed inlets is connected to the first sludge outlet pipe, and the second sludge outlet pipe. The plurality of feed outlets is sequentially connected to the sludge dewatering device and the liquid collection device via the third diversion tube. The liquid collection device is connected to a carbon source feeder via the fourth diversion pipe.

In a class of this embodiment, the operational parameters of the ABN reactor are defined as follows: in the biosorption tank, the sludge concentration is 1500-2000 mg/L, the sludge age is 0.2-0.7 d, the hydraulic retention time is 0.5-0.75 h, the dissolved oxygen concentration is <0.8 mg/L, and the sludge return ratio is 30-70%; in the biologically-enhanced degradation tank, the sludge concentration is 2000-4000 mg/L, the sludge age is 15-25 d, the hydraulic retention time is 5-9 h, the dissolved oxygen concentration is 3-6 mg/L, and the sludge return ratio is 50-100%; in the denitrification biofilter, the filtration velocity is 3-10 m/h, and in the backwash process, the gas-washing time is 2-5 minutes and the water-washing time is 5-15 minutes.

In a class of this embodiment, the integrated fixed-film activated sludge system comprises a suspended filler with a specific surface area of >800 $m^2/m^3$ and a filling ratio of 30-60%.

In a class of this embodiment, the density of the denitrification filler is ≥2.5 $g/cm^3$.

In a class of this embodiment, the plurality of adsorption devices each comprises a rack and an adsorbent material. The rack is filled with the adsorption material comprising a macroporous carbon xerogel with pore diameters of 15-60 nm, a mesoporous carbon xerogel with pore diameters of 10-20 nm, and a microporous carbon xerogel with pore diameters of 1.5-12 nm. The macroporous carbon xerogel, the mesoporous carbon xerogel, and the microporous carbon xerogel are disposed from top to bottom, with a filling ratio of 1:1.5:1-1:3:2. The plurality of adsorption devices each has a down-flow hydraulic load of 0.2-3.3 $L/(m^2·s)$.

In a class of this embodiment, the disinfection reactor uses ultraviolet disinfection. An ultraviolet lamp is disposed in the disinfection reactor. The hydraulic load of the ultraviolet lamp is 100-500 $m^3/(d·UV$ lamp), the penetration rate of ultraviolet light is ≥50%, and the effective dose of ultraviolet light is ≥20 $mJ/cm^2$.

In a class of this embodiment, the operational parameters of the anaerobic fermentation reactor are defined as follows: the sludge anaerobic digestion time is 8-10 d, the pH value is 9-10, and the digestion temperature is 25-35° C.

In a class of this embodiment, the sludge dewatering device is configured to separates sludge from water. The liquid collection device is configured to store an alkaline fermentation liquid. The sludge is discharged from a sludge discharge pipe. A certain amount of coagulant such as iron salt or aluminum salt is added to the sludge mixture during the dewatering process.

The following advantages are associated with the system for cleaning wastewater of the disclosure:
1) the ABN reactor is an integrated reactor with a small construction area, having a strong resistance to the impact load and a strong adaptability to changes in the water quality and quantity; in the biologically-enhanced degradation tank, the suspended filler effectively enriches the nitrifying bacteria and improves the nitrification process;
2) the sequential adsorption reactor adopts carbon xerogel with different diameters to adsorb high-risk pollutants, which can effectively solve the problem of poor adsorption effect of single pore adsorption material due to the complex and unique nature of high-risk pollutants;
3) the system of the disclosure uses the alkaline fermentation liquid as an external carbon source of denitrification biofilter, thus achieving the recycling of resources; and
4) the system of the disclosure effectively removes high-risk pollutants from wastewater and reduces effluent toxicity, which can be used for the upgrading and reconstruction of the system for cleaning wastewater.

DETAILED DESCRIPTION

To further illustrate the disclosure, embodiments detailing a system for cleaning wastewater are described below. It should be noted that the following embodiments are intended to describe and not to limit the disclosure.

Example 1

Figure 1:
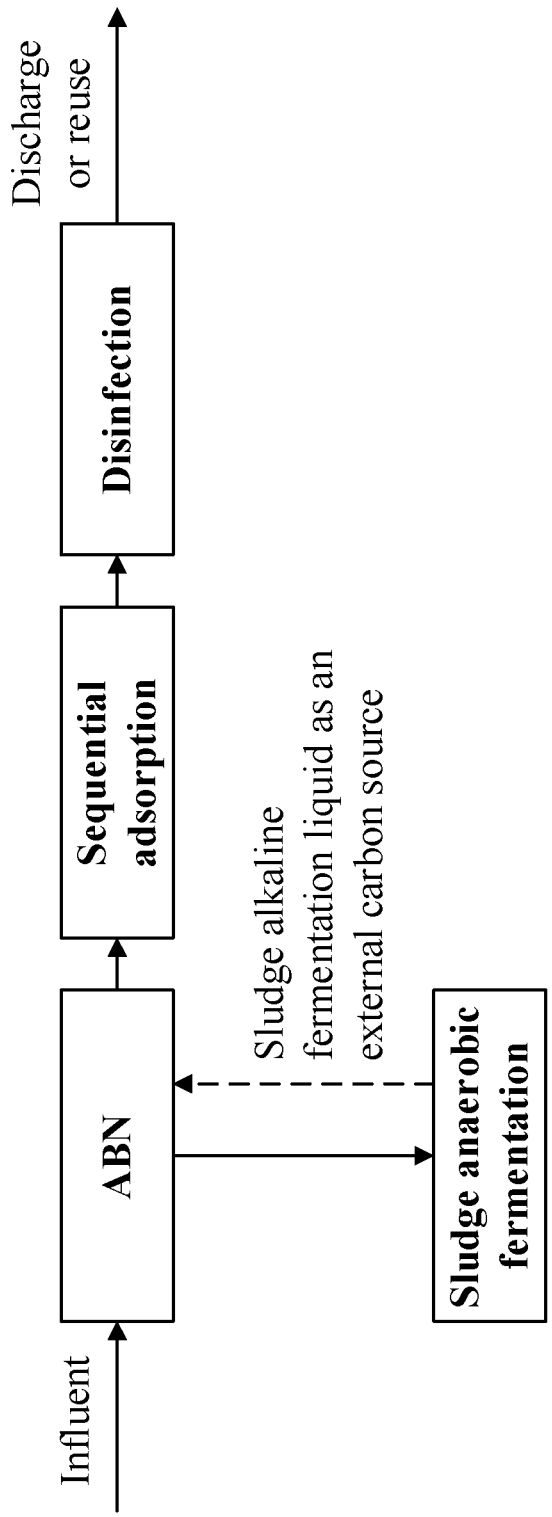
FIG. 1 is a schematic block diagram illustrating a system for cleaning wastewater according to one embodiment of the disclosure.

In this example, the system for cleaning wastewater, with a capacity of 500 L/d, is used to treat domestic wastewater from a city. The treated wastewater has a chemical oxygen demand (COD) of 252.14 mg/L, total nitrogen of 38.70 mg/L, total phosphorous of 3.71 mg/L, ammonia nitrogen of 25.03 mg/L, and pH of 6.8. The treated wastewater can be returned to the rivers. Referring to FIG. 1, the system for cleaning wastewater comprises an ABN reactor, a sequential adsorption reactor, a disinfection reactor, and a sludge anaerobic fermentation reactor, which are connected in parallel.

Figure 2:
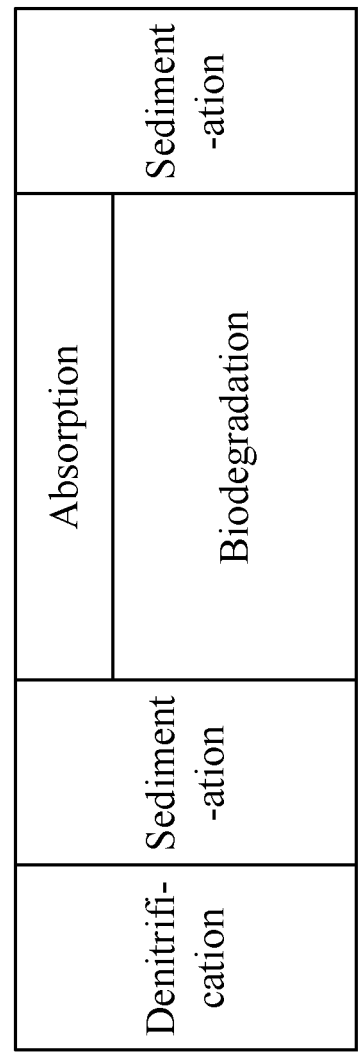
FIG. 2 is a schematic flow chart diagram illustrating an ABN reactor according to one embodiment of the disclosure.

Referring to FIG. 2, the ABN reactor is an integrated reactor comprising five secondary treatment units: a biosorption tank, an intermediate sedimentation tank, a biologically-enhanced degradation tank, a denitrification biofilter, and a secondary sedimentation tank, which are connected sequentially and separated from each other by a partition wall. The biosorption tank is filled with high-load activated sludge. The biosorption tank comprises a first water inlet, a first water outlet, a first stirring device, a first aeration device, and a first sludge return port. The first water inlet is disposed on the first end of the biosorption tank and the first water outlet is disposed on the second end of the biosorption tank. The first stirring device, the first aeration device, and the first sludge return port are disposed in the bottom of the biosorption tank. The first water outlet communicates with the intermediate sedimentation tank. The intermediate sedimentation tank comprises a first slope plate, a first sludge outlet, and a second water outlet. The first slope plate is disposed in the intermediate sedimentation tank. The first sludge outlet communicates with a first sludge return pipe and a first sludge outlet pipe. The second water outlet is disposed on the rear end of the intermediate sedimentation tank and communicates with the biologically-enhanced degradation tank. The first sludge return pipe is connected to the first sludge return port. The biologically-enhanced degradation tank is an integrated fixed-film activated sludge system. The biologically-enhanced degradation tank comprises a second aeration device, a second sludge return port, a filler interceptor, and a third water outlet. The second aeration device and the second sludge return port are disposed in the bottom of the biologically-enhanced degradation tank. The filler interceptor is disposed on one end of the biologically-enhanced degradation tank and is connected through the third water outlet to the secondary sedimentation tank. The secondary sedimentation tank comprises a second slope plate, a second sludge outlet pipe, and a fourth water outlet. The second slope plate is disposed in the secondary sedimentation tank. The second sludge outlet pipe is disposed in the bottom of the secondary sedimentation tank and is configured to communicate with a second sludge return pipe and a second sludge outlet pipe. The second sludge return pipe is connected to the second sludge return port. The fourth water outlet is disposed on one end of the secondary sedimentation tank and is connected to the denitrification biofilter. The denitrification biofilter is a downflow denitrification biofilter comprising a carbon source dosing device, an inlet channel, a backwash air inlet, and a backwash water outlet, a denitrification filler, a supporting layer, an air-water distribution device, a backwash water inlet, a water collection channel, and a fifth water outlet. The carbon source dosing device, the inlet channel, the backwash air inlet, and the backwash water outlet are disposed on the top portion of the denitrification biofilter. The denitrification filler is disposed in the denitrification biofilter. The supporting layer, the air-water distribution device, the backwash water inlet, the water collection channel, and the fifth water outlet are disposed in the bottom of the denitrification biofilter.

The sequential adsorption reactor is a cylindrical reactor comprising secondary treatment units, an overflow pipe, a second water inlet, a third sludge outlet, and a sixth water outlet. The second water inlet and the third sludge outlet are disposed in the middle of the bottom of the sequential adsorption reactor. The sixth water outlet is disposed on the outside bottom of the sequential adsorption reactor. The secondary treatment units each comprises a plurality of adsorption devices. The second water inlet is connected to the overflow pipe. The fifth water outlet is connected through a first diversion pipe to the fifth water outlet.

The disinfection reactor comprises a third water inlet, a disinfection device, a diversion wall, and a seventh water outlet. The third water inlet is disposed on the first end of the disinfection reactor. The disinfection device and the diversion wall are disposed in the disinfection reactor. The seventh water outlet is disposed in the bottom of the second end of the disinfection reactor and is connected to the drainage pipe. The third water inlet is connected through the second diversion tube to the sixth water outlet.

The sludge anaerobic fermentation reactor is a cylindrical upflow reactor comprising a gas emission device, a plurality of feed inlets, a second stirring device, a plurality of feed outlets, a sludge circulating pipe, a sludge dewatering device, a liquid collection device. The gas emission device is disposed on the sludge anaerobic fermentation reactor. The plurality of feed inlets is disposed in the lower part of the sludge anaerobic fermentation reactor. The second stirring device is disposed in the sludge anaerobic fermentation reactor. The plurality of feed outlets and the sludge circulating pipe are disposed at different water levels marked in the sludge anaerobic fermentation reactor. The sludge dewatering device and the liquid collection device are disposed outside of the sludge anaerobic fermentation reactor. The plurality of feed inlets is connected to the first sludge outlet pipe, and the second sludge outlet pipe. The plurality of feed outlets is sequentially connected to the sludge dewatering device and the liquid collection device via the third diversion tube. The liquid collection device is connected to a carbon source feeder via the fourth diversion pipe.

The operational parameters of the system for cleaning wastewater are defined as follows:

1) In the ABN reactor: in the biosorption tank, the sludge concentration is 2000 mg/L, the sludge age is 0.7 d, the hydraulic retention time is 0.5 h, the dissolved oxygen concentration is <0.8 mg/L, and the sludge return ratio is 60%; in the biologically-enhanced degradation tank, the sludge concentration is 4000 mg/L, the sludge age is 25 d, the hydraulic retention time is 6 h, the dissolved oxygen concentration is 5 mL, and the sludge return ratio is 80%; the integrated fixed-film activated sludge system comprises a suspended filler with a specific surface area of >800 $m^2/m^3$ and a filling ratio of 50%; in the denitrification biofilter, the filtration velocity is 7 m/h, and in the backwash process, the gas-washing time is 5 minutes and the water-washing time is 15 minutes, and the density of the denitrification filler is ≥2.5 $g/cm^3$.

2) In the sequential adsorption reactor, the plurality of adsorption devices each comprises a rack and an adsorbent material. The rack is filled with the adsorption material comprising a macroporous carbon xerogel with a pore diameter of 60 nm, a mesoporous carbon xerogel with a pore diameter of 20 nm, and a microporous carbon xerogel with a pore diameter of 12 nm. The macroporous carbon xerogel, the mesoporous carbon xerogel, and the microporous carbon xerogel are disposed from top to bottom, with a filling ratio of 1:3:2. The plurality of adsorption devices each has a downflow hydraulic load of 3.3 $L/(m^2·s)$.

3) The disinfection reactor uses ultraviolet disinfection. An ultraviolet lamp is disposed in the disinfection reactor. The hydraulic load of the ultraviolet lamp is 100-500 $m^3/(d·UV\ lamp)$, the penetration rate of ultraviolet light is ≥50%, and the effective dose of ultraviolet light is ≥20 $mJ/cm^2$.

4) The operational parameters of the anaerobic fermentation reactor are defined as follows: the sludge anaerobic digestion time is 10 d, the pH value is 10, and the digestion temperature is 35° C. The sludge dewatering device is configured to separates sludge from water. The liquid collection device is configured to store an alkaline fermentation liquid. The sludge is discharged from a sludge discharge pipe. A certain amount of coagulant such as iron salt or aluminum salt is added to the sludge mixture during the dewatering process.

The indicators of the quality of the treated wastewater are as follows: chemical oxygen demand (COD) is 19.63 mg/L, total nitrogen is 8.51 mg/L, total phosphorous is 0.12 mg/L, ammonia nitrogen is 0.05 mg/L, and pH is 7.0. The water quality indicators, turbidity, biochemical oxygen demand ($BOD_5$), residual chlorine, and *Escherichia coli* (*E. coli*) meet the requirements of Chinese national standard "The reuse of urban recycling water-water quality standard for scenic environment use" (GBT18921-2019). Compared to the conventional wastewater treatment processes (A/A/O+ activated carbon adsorption+ultraviolet disinfection), the system of the disclosure increases the removal rate of the high-risk pollutants from wastewater by 67.3%, reduces effluent toxicity by 40.7%, and reduces the carbon source dosage by 60.4%.

The process parameters and operation conditions, including the selected values of the example and other values within the scope of the description, are not detailed one by one, and those in the art can implement the invention according to the description of the disclosure.

Example 2

Example 2 is basically the same as Example 1 except that the treated wastewater has a chemical oxygen demand (COD) of 113.85 mg/L, total nitrogen of 26.8 mg/L, total phosphorous of 3.78 mg/L, ammonia nitrogen of 19.37 mg/L, and pH of 7.3. The system for cleaning wastewater comprises an ABN reactor, a sequential adsorption reactor, a disinfection reactor, and a sludge anaerobic fermentation reactor, which are connected in parallel.

The ABN reactor is an integrated reactor comprising five secondary treatment units: a biosorption tank, an intermediate sedimentation tank, a biologically-enhanced degradation tank, a denitrification biofilter, and a secondary sedimentation tank, which are connected sequentially and separated from each other by a partition wall. The biosorption tank is filled with high-load activated sludge. The biosorption tank comprises a first water inlet, a first water outlet, a first stirring device, a first aeration device, and a first sludge return port. The first water inlet is disposed on the first end of the biosorption tank and the first water outlet is disposed on the second end of the biosorption tank. The first stirring device, the first aeration device, and the first sludge return port are disposed in the bottom of the biosorption tank. The first water outlet communicates with the intermediate sedimentation tank. The intermediate sedimentation tank comprises a first slope plate, a first sludge outlet, and a second water outlet. The first slope plate is disposed in the intermediate sedimentation tank. The first sludge outlet communicates with a first sludge return pipe and a first sludge outlet pipe. The second water outlet is disposed on the rear end of the intermediate sedimentation tank and communicates with the biologically-enhanced degradation tank. The first sludge return pipe is connected to the first sludge return port. The biologically-enhanced degradation tank is an integrated fixed-film activated sludge system. The biologically-enhanced degradation tank comprises a second aeration device, a second sludge return port, a filler interceptor, and a third water outlet. The second aeration device and the second sludge return port are disposed in the bottom of the biologically-enhanced degradation tank. The filler interceptor is disposed on one end of the biologically-enhanced degradation tank and is connected through the third water outlet to the secondary sedimentation tank. The secondary sedimentation tank comprises a second slope plate, a second sludge outlet pipe, and a fourth water outlet. The second slope plate is disposed in the secondary sedimentation tank. The second sludge outlet pipe is disposed in the bottom of the secondary sedimentation tank and is configured to communicate with a second sludge return pipe and a second sludge outlet pipe. The second sludge return pipe is connected to the second sludge return port. The fourth water outlet is disposed on one end of the secondary sedimentation tank and is connected to the denitrification biofilter. The denitrification biofilter is a downflow denitrification biofilter comprising a carbon source dosing device, an inlet channel, a backwash air inlet, and a backwash water outlet, a denitrification filler, a supporting layer, an air-water distribution device, a backwash water inlet, a water collection channel, and a fifth water outlet. The carbon source dosing device, the inlet channel, the backwash air inlet, and the backwash water outlet are disposed on the top portion of the denitrification biofilter. The denitrification filler is disposed in the denitrification biofilter. The supporting layer, the air-water distribution device, the backwash water inlet, the water collection channel, and the fifth water outlet are disposed in the bottom of the denitrification biofilter.

The sequential adsorption reactor is a cylindrical reactor comprising secondary treatment units, an overflow pipe, a second water inlet, a third sludge outlet, and a sixth water outlet. The second water inlet and the third sludge outlet are disposed in the middle of the bottom of the sequential adsorption reactor. The sixth water outlet is disposed on the outside bottom of the sequential adsorption reactor. The secondary treatment units each comprises a plurality of adsorption devices. The second water inlet is connected to the overflow pipe. The fifth water outlet is connected through a first diversion pipe to the fifth water outlet.

The disinfection reactor comprises a third water inlet, a disinfection device, a diversion wall, and a seventh water outlet. The third water inlet is disposed on the first end of the disinfection reactor. The disinfection device and the diversion wall are disposed in the disinfection reactor. The seventh water outlet is disposed in the bottom of the second end of the disinfection reactor and is connected to a drainage pipe. The third water inlet is connected through the second diversion tube to the sixth water outlet.

The sludge anaerobic fermentation reactor is a cylindrical upflow reactor comprising a gas emission device, a plurality of feed inlets, a second stirring device, a plurality of feed outlets, a sludge circulating pipe, a sludge dewatering device, a liquid collection device. The gas emission device is disposed on the sludge anaerobic fermentation reactor. The plurality of feed inlets is disposed in the lower part of the sludge anaerobic fermentation reactor. The second stirring device is disposed in the sludge anaerobic fermentation reactor. The plurality of feed outlets and the sludge circulating pipe are disposed at different water levels marked in the sludge anaerobic fermentation reactor. The sludge dewatering device and the liquid collection device are disposed outside of the sludge anaerobic fermentation reactor. The plurality of feed inlets is connected to the first sludge outlet pipe, and the second sludge outlet pipe. The plurality of feed outlets is sequentially connected to the sludge dewatering device and the liquid collection device via the third diversion tube. The liquid collection device is connected to a carbon source feeder via the fourth diversion pipe.

The operational parameters of the system for cleaning wastewater are defined as follows:
 1) in the ABN reactor: in the biosorption tank, the sludge concentration is 1800 mg/L, the sludge age is 0.5 d, the hydraulic retention time is 0.6 h, the dissolved oxygen concentration is <0.8 mg/L, and the sludge return ratio is 50%; in the biologically-enhanced degradation tank, the sludge concentration is 3000 mg/L, the sludge age is 20 d, the hydraulic retention time is 5 h, the dissolved oxygen concentration is 4 mg/L, and the sludge return ratio is 70%; the integrated fixed-film activated sludge system comprises a suspended filler with a specific surface area of >800 m$^2$/m$^3$ and a filling ratio of 40%; in the denitrification biofilter, the filtration velocity is 9 m/h, and in the backwash process, the gas-washing time is 3 minutes and the water-washing time is 12 minutes, and the density of the denitrification filler is ≥2.5 g/cm$^3$;

2) in the sequential adsorption reactor, the plurality of adsorption devices each comprises a rack and an adsorbent material. The rack is filled with the adsorption material comprising a macroporous carbon xerogel with a pore diameter of 40 nm, a mesoporous carbon xerogel with a pore diameter of 15 nm, and a microporous carbon xerogel with a pore diameter of 5 nm. The macroporous carbon xerogel, the mesoporous carbon xerogel, and the microporous carbon xerogel are disposed from top to bottom, with a filling ratio of 1:2.5:2. The plurality of adsorption devices each has a downflow hydraulic load of 2.5 L/(m$^2$·s);

3) the disinfection reactor uses ultraviolet disinfection. An ultraviolet lamp is disposed in the disinfection reactor. The hydraulic load of the ultraviolet lamp is 100-300 m$^3$/(d·UV lamp), the penetration rate of ultraviolet light is ≥50%, and the effective dose of ultraviolet light is ≥20 mJ/cm$^2$; and 4) the operational parameters of the anaerobic fermentation reactor are defined as follows: the sludge anaerobic digestion time is 8 d, the pH value is 9, and the digestion temperature is 30° C. The sludge dewatering device is configured to separates sludge from water. The liquid collection device is configured to store an alkaline fermentation liquid. The sludge is discharged from a sludge discharge pipe. A certain amount of coagulant such as iron salt or aluminum salt is added to the sludge mixture during the dewatering process.

The indicators of the quality of the treated wastewater are as follows: chemical oxygen demand (COD) is 11.62 mg/L, total nitrogen is 5.31 mg/L, total phosphorous is 0.18 mg/L, ammonia nitrogen is 0.12 mg/L, and pH is 7.1. The wastewater is treated to the Grade A standard outlined in "Discharge standard of pollutants for municipal wastewater treatment plant" (National standardGBT18921-2002) and to the discharge standard of main water pollutants in the first class and second class protected areas of Taihu basin outlined in "Discharge standard of main water pollutants for municipal wastewater treatment plant & key industries of Taihu area". Compared to the conventional wastewater treatment processes (A/A/O+activated carbon adsorption+ultraviolet disinfection), the system of the disclosure increases the removal rate of the high-risk pollutants from wastewater by 68.4%, reduces the toxicity by 51.1%, and reduces the carbon source dosage by 50.5%.

It will be obvious to those skilled in the art that changes and modifications may be made, and therefore, the aim in the appended claims is to cover all such changes and modifications.

The invention claimed is:

1. A system for cleaning wastewater, comprising:
an absorption-biodegradation-denitrification (ABN) reactor;
a sequential adsorption reactor;
a disinfection reactor; and
a sludge anaerobic fermentation reactor;
wherein:
the ABN reactor is an integrated reactor comprising five secondary treatment units: a biosorption tank, an intermediate sedimentation tank, a biologically-enhanced degradation tank, a denitrification biofilter, and a secondary sedimentation tank, which are connected sequentially and separated from each other by a partition wall; the biosorption tank is filled with high-load activated sludge; the biosorption tank comprises a first water inlet, a first water outlet, a first stirring device, a first aeration device, and a first sludge return port; the first water inlet is disposed on a first end of the biosorption tank and the first water outlet is disposed on a second end of the biosorption tank; the first stirring device, the first aeration device, and the first sludge return port are disposed in a bottom of the biosorption tank; the first water outlet communicates with the intermediate sedimentation tank; the intermediate sedimentation tank comprises a first slope plate, a first sludge outlet, and a second water outlet; the first slope plate is disposed in the intermediate sedimentation tank; the first sludge outlet communicates with a first sludge return pipe and a first sludge outlet pipe; the second water outlet is disposed on a rear end of the intermediate sedimentation tank and communicates with the biologically-enhanced degradation tank; the first sludge return pipe is connected to the first sludge return port; the biologically-enhanced degradation tank is an integrated fixed-film activated sludge system; the biologically-enhanced degradation tank comprises a second aeration device, a second sludge return port, a filler interceptor, and a third water outlet; the second aeration device and the second sludge return port are disposed in the bottom of the biologically-enhanced degradation tank; the filler interceptor is disposed on one end of the biologically-enhanced degradation tank and is connected through the third water outlet to the secondary sedimentation tank; the secondary sedimentation tank comprises a second slope plate, a second sludge outlet pipe, and a fourth water outlet; the second slope plate is disposed in the secondary sedimentation tank; the second sludge outlet pipe is disposed in the bottom of the secondary sedimentation tank and is configured to communicate with a second sludge return pipe and a second sludge outlet pipe; the second sludge return pipe is connected to the second sludge return port; the fourth water outlet is disposed on one end of the secondary sedimentation tank and is connected to the denitrification biofilter; the denitrification biofilter is a downflow denitrification biofilter comprising a carbon source dosing device, an inlet channel, a backwash air inlet, and a backwash water outlet, a denitrification filler, a supporting layer, an air-water distribution device, a backwash water inlet, a water collection channel, and a fifth water outlet; the carbon source dosing device, the inlet channel, the backwash air inlet, and the backwash water outlet are disposed on the top portion of the denitrification biofilter; the denitrification filler is disposed in the denitrification biofilter; the supporting layer, the air-water distribution device, the backwash water inlet, the water collection channel, and the fifth water outlet are disposed in the bottom of the denitrification biofilter;

the sequential adsorption reactor is a cylindrical reactor comprising secondary treatment units, an overflow pipe, a second water inlet, a third sludge outlet, and a sixth water outlet; the second water inlet and the third sludge outlet are disposed in the middle of the bottom of the sequential adsorption reactor; the sixth water outlet is disposed on the outside bottom of the sequential adsorption reactor; the secondary treatment units each comprises a plurality of adsorption devices; the second water inlet is connected to the overflow pipe; and the fifth water outlet is connected through a first diversion pipe to the fifth water outlet;

the disinfection reactor comprises a third water inlet, a disinfection device, a diversion wall, a seventh water outlet, and a drainage pipe; the third water inlet is disposed on a first end of the disinfection reactor; the disinfection device and the diversion wall are disposed in the disinfection reactor; the seventh water outlet is disposed in a bottom of a second end of the disinfection reactor and is connected to a drainage pipe; the third water inlet is connected through the second diversion tube to the sixth water outlet; and the sludge anaerobic fermentation reactor is a cylindrical upflow reactor comprising a gas emission device, a plurality of feed inlets, a second stirring device, a plurality of feed outlets, a sludge circulating pipe, a sludge dewatering device, a liquid collection device; the gas emission device is disposed on the sludge anaerobic fermentation reactor; the plurality of feed inlets is disposed in the lower part of the sludge anaerobic fermentation reactor; the second stirring device is disposed in the sludge anaerobic fermentation reactor; the plurality of feed outlets and the sludge circulating pipe are disposed at different water levels marked in the sludge anaerobic fermentation reactor; the sludge dewatering device and the liquid collection device are disposed outside of the sludge anaerobic fermentation reactor; the plurality of feed inlets is connected to the first sludge outlet pipe, and the second sludge outlet pipe; the plurality of feed outlets is sequentially connected to the sludge dewatering device and the liquid collection device via the third diversion tube; the liquid collection device is connected to a carbon source feeder via the fourth diversion pipe.

2. The system of claim 1, wherein the operational parameters of the ABN reactor are defined as follows: in the biosorption tank, a sludge concentration is 1500-2000 mg/L, a sludge age is 0.2-0.7 d, a hydraulic retention time is 0.5-0.75 h, a dissolved oxygen concentration is <0.8 mg/L, and a sludge return ratio is 30-70%; in the biologically-enhanced degradation tank, a sludge concentration is 2000-4000 mg/L, a sludge age is 15-25 d, a hydraulic retention time is 5-9 h, a dissolved oxygen concentration is 3-6 mg/L, and a sludge return ratio is 50-100%; and in the denitrification biofilter, a filtration velocity is 3-10 m/h, and in a backwash process, a gas-washing time is 2-5 minutes and a water-washing time is 5-15 minutes.

3. The system of claim 1, wherein the integrated fixed-film activated sludge system comprises a suspended filler with a surface area of greater than 800 $m^2/m^3$ and a filling ratio of 30-60%.

4. The system of claim 1, wherein a density of the denitrification filler is greater than or equal to 2.5 $g/cm^3$.

5. The system of claim 1, wherein the plurality of adsorption devices each comprises a rack and an adsorbent material; the rack is filled with the adsorbent material comprising a macroporous carbon xerogel with pore diameters of 15-60 nm, a mesoporous carbon xerogel with pore diameters of 10-20 nm, and a microporous carbon xerogel with pore diameters of 1.5-12 nm; the macroporous carbon xerogel, the mesoporous carbon xerogel, and the microporous carbon xerogel are disposed from top to bottom, with a filling ratio of 1:1.5:1-1:3:2; the plurality of adsorption devices each has a down-flow hydraulic load of 0.2-3.3 $L/(m^2 \cdot s)$.

6. The system of claim 1, wherein the disinfection reactor uses ultraviolet disinfection; an ultraviolet lamp is disposed in the disinfection reactor; a hydraulic load of the ultraviolet lamp is 100-500 $m^3/(d \cdot UV$ lamp), a penetration rate of ultraviolet light is ≥50%, and an effective dose of ultraviolet light is ≥20 $mJ/cm^2$.

7. The system of claim 1, wherein the operational parameters of the anaerobic fermentation reactor are defined as follows: a sludge anaerobic digestion time is 8-10 d, a pH value is 9-10, and a digestion temperature is 25-35° C.

8. The system of claim 1, wherein the sludge dewatering device is configured to separate sludge from water; the liquid collection device is configured to store an alkaline fermentation liquid; the sludge is discharged from a sludge discharge pipe; a coagulant comprising iron salt or aluminum salt is added to a mixture of the sludge and water during a dewatering process.

* * * * *